United States Patent
Spotnitz et al.

(10) Patent No.: US 6,322,923 B1
(45) Date of Patent: *Nov. 27, 2001

(54) SEPARATOR FOR GEL ELECTROLYTE BATTERY

(75) Inventors: Robert Mark Spotnitz, Charlotte, NC (US); Charles Glen Wensley, Rock Hill, SC (US)

(73) Assignee: Celgard Inc., Charlotte, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,024

(22) Filed: Jan. 30, 1998

(51) Int. Cl.$^7$ .............................. H01M 2/14; H01M 2/16
(52) U.S. Cl. ........................ 429/144; 429/249; 429/145
(58) Field of Search ................................ 429/247, 249, 429/144, 145, 142, 304, 306, 309, 316, 254

(56) References Cited

U.S. PATENT DOCUMENTS

| | | | |
|---|---|---|---|
| 3,861,963 | * 1/1975 | Afrance et al. | |
| 4,650,730 | 3/1987 | Lundquist et al. | 429/62 |
| 4,731,304 | 3/1988 | Lundquist et al. | 429/62 |
| 5,240,655 | 8/1993 | Troffkin et al. | 264/28 |
| 5,281,491 | 1/1994 | Rein et al. | 429/62 |
| 5,296,318 | 3/1994 | Gozdz et al. | 429/192 |
| 5,409,588 | * 4/1995 | Mushiake et al. | 204/252 |
| 5,418,091 | * 5/1995 | Gozdz et al. | 429/252 |
| 5,437,692 | 8/1995 | Dasgupta et al. | 29/623.1 |
| 5,460,904 | 10/1995 | Gozdz et al. | 429/192 |
| 5,565,281 | 10/1996 | Yu et al. | 429/62 |
| 5,639,573 | * 6/1997 | Oliver et al. | 429/303 |
| 5,667,911 | 9/1997 | Yu et al. | 429/144 |
| 5,681,357 | 10/1997 | Eschbach et al. | 29/623.5 |
| 5,688,293 | 11/1997 | Oliver et al. | 29/623.1 |
| 6,024,773 | 2/2000 | Inuzuka et al. | 29/623.4 |

FOREIGN PATENT DOCUMENTS

| | | |
|---|---|---|
| 2298817 A | 9/1996 | (GB) . |
| 307146/1995 | 12/1994 | (JP) . |

* cited by examiner

Primary Examiner—Stephen Kalafut
Assistant Examiner—Jonathan Crepeau
(74) Attorney, Agent, or Firm—Robert H. Hammer, III

(57) ABSTRACT

A battery separator for a gel electrolyte battery includes a microporous membrane; and an adherent coating thereon, or a gel-forming coating thereon, the gel-forming coating including a gel-forming polymer and a plasticizer. The gel-forming polymer is preferably a poly(vinylidene fluoride:hexafluoropropylene) copolymer, and the plasticizer is preferably an ester.

21 Claims, 4 Drawing Sheets

SEPARATOR FOR GEL ELECTROLYTE BATTERY

FIELD OF THE INVENTION

The instant invention is directed to a separator for a gel electrolyte battery.

BACKGROUND OF THE INVENTION

Lightweight rechargeable batteries are used in many electrically powered devices, for example, cellular phones, pagers, computers, and power tools. One popular rechargeable battery is the lithium ion battery. Lithium ion batteries that are commercially available today use a liquid electrolyte. This electrolyte is organically based. Consequently, lithium ion batteries must be sealed in rigid 'cans' to prevent the leakage of the electrolyte. There is a desire to eliminate the rigid can and move toward flexible, light-weight, leak-tight packaging, e.g., metallized plastic or foil bags.

One method suggested for eliminating the can is the use of solid electrolytes. See U.S. Pat. Nos. 5,296,318; 5,437,692; 5,460,904; 5,639,573; 5,681,357; and 5,688,293. Solid electrolytes include two types, a solid electrolyte and a gel electrolyte. Of these two types, the gel electrolyte is preferred because of its greater conductivity. Gel electrolytes, however, are deficient because they cannot easily provide the structural integrity necessary to separate the positive and negative electrodes,for example, during manufacture, and to provide the shutdown capability necessary to safely handle the electrodes, for example, during an overcharge condition.

In U.S. Pat. Nos. 5,639,573; 5,681,357; and 5,688,293, it is proposed that a microporous membrane (or inert layer), in combination with an absorbing or gel-forming polymer, be used as a separator system. After the electrolyte is injected into the separator system, the gel-forming polymer is cured to form the gelled electrolyte around the microporous membrane whereby the structural intregity of the gel electrolyte is enhanced by the inclusion of a microporous membrane.

In the manufacture of the foregoing battery, the occurrence of delamination or separation of the absorbing or gel-forming layer from the inert layer is detrimental. Accordingly, there is a need for a new separator which improves the adherence of the microporous membrane to the gel-forming polymer and thereby reduces delamination or separation of these two components during manufacturing.

SUMMARY OF THE INVENTION

The present invention is to a battery separator, particularly useful in a gel electrolyte battery, including a microporous polymer membrane; and an adherent coating having a surface density <0.3 mg/cm$^2$ thereon, or a gel-forming coating thereon, the gel-forming coating including a gel-forming polymer and a plasticizer.

DESCRIPTION OF THE DRAWINGS

For the purpose of illustrating the invention, there is shown in the drawings a form which is present preferred; it being understood, however, that this invention is not limited to the precise arrangements and instrumentalities shown.

DETAILED DESCRIPTION OF THE INVENTION

Figure 1:
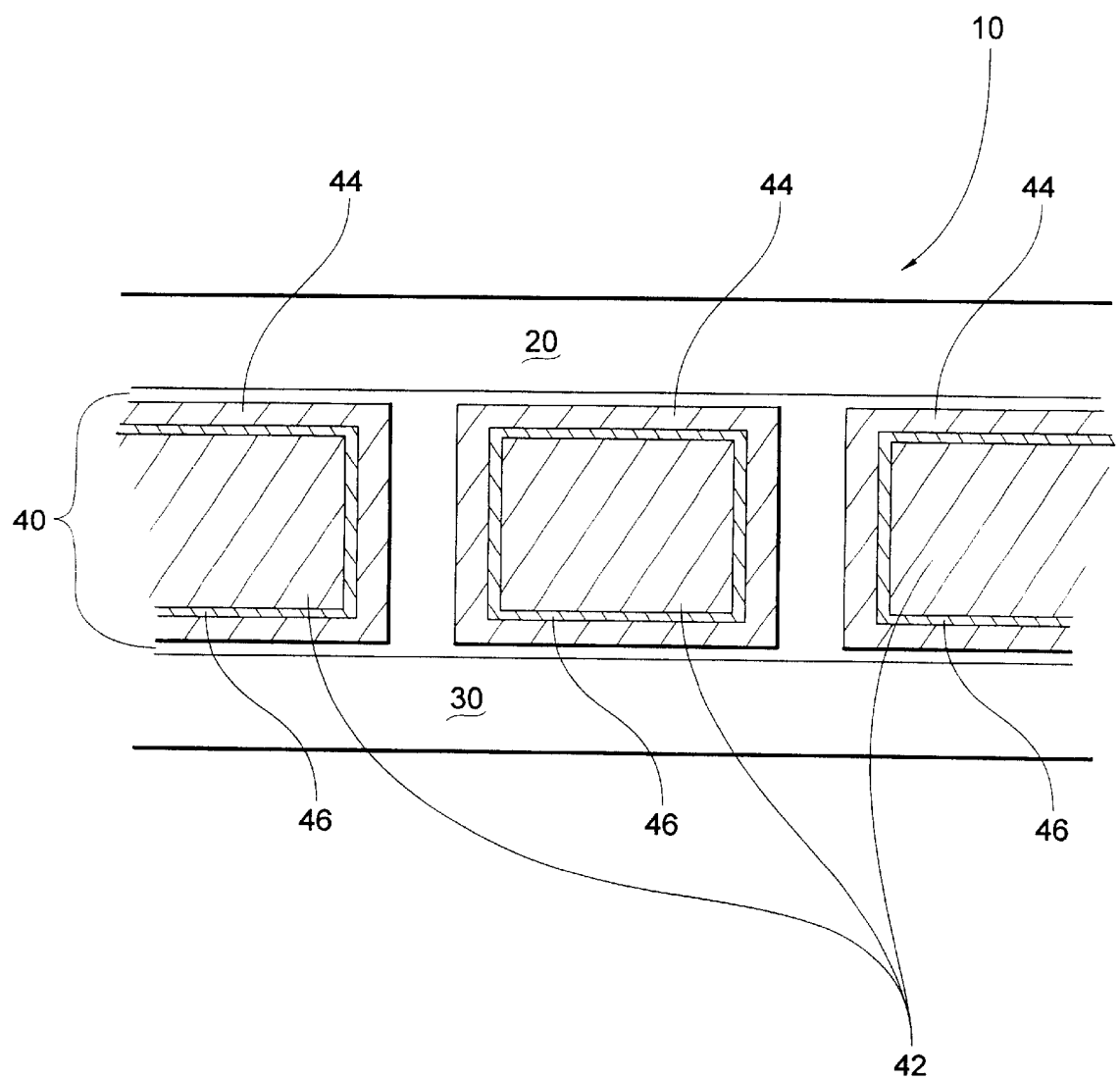
FIG. 1 is a cross-sectional schematic illustration of a battery.

Referring to the drawings, wherein like numerals indicate like elements, there is shown in FIG. 1 a battery 10. Battery 10 comprises a positive electrode 20, a negative electrode 30, and an electrolyte/separator system 40 therebetween. Electrolyte/separator system 40 comprises a microporous membrane 42, a gel electrolyte 44, and an adherent coating 46 therebetween.

In general, batteries 10 with negative and positive electrodes are well known and reference may be made to D. Linden (Ed.), *Handbook of Batteries*, 2d, McGraw-Hill Inc., New York, NY, (1995), U.S. Pat. Nos. 5,296,318; 5,437,692; 5,460,904; 5,639,573; 5,681,357; and 5,688,293, and Japanese Patent Application Nos. 59-106556 (filed May 28, 1984), and 61-265840 (filed Nov. 8, 1986) which are incorporated herein by reference. Preferably, the battery is a lithium ion battery, and most preferred is a lithium ion battery with a gel electrolyte.

Referring to electrolyte/separator system 40, its advantage is the inclusion of the adherent coating 46 between microporous membrane 42 and the electrolyte gel 44. The gel-forming polymer (and/or the combination of gel-forming polymer and electrolyte) has a tendency to delaminate or strip away from the microporous membrane 42. Accordingly, the adherent coating 46 is applied onto the surface of the microporous membrane 42 prior to application of the gel-forming polymer (and/or the combination of polymer and electrolyte) to facilitate bonding therebetween.

Microporous membrane 42 refers to any microporous membrane. Membrane 42 may be made from polyolefins. Exemplary polyolefins include, but are not limited to, polyethylene (PE), polypropylene(PP), and polymethylpentene (PMP). Membrane 42 may be made by either a dry stretch process (also known as the CELGARD process) or a solvent process (also known as the gel extrusion or phase separation process). Membrane 42 may have the following characteristics: an air permeability of no more than 300 sec/100 cc (preferably 200 sec/100 cc, most preferably 150 sec/100 cc); a thickness ranging from 5 to 500 $\mu$ (preferably 10 to 100 $\mu$, most preferably 10 to 50 $\mu$); pore diameters ranging from 0.01 to 10 $\mu$ (preferably 0.05 to 5 $\mu$, most preferably 0.05 to 0.5$\mu$); and a porosity ranging from 35 to 85% (preferably 40 to 80%). Membrane 42 is preferably a shut down separator, for example see U.S. Pat. Nos. 4,650,730; 4,731,304; 5,281,491; 5,240,655; 5,565,281; 5,667,911; Application Ser. No. 08/839,664 (filed Apr. 15, 1997), now U.S. Pat. No. 5,952,120; Japanese Patent No. 2642206 and Japanese Patent Application Nos. 98395/1994 (filed May 12, 1994); 7/56320 (filed Mar. 15, 1995); and U.K. Patent Application No. 9604055.5 (Feb. 27, 1996), which are incorporated herein by reference. Membranes 42 are commercially available from: CELGARD LLC, Charlotte, NC, USA; Asahi Chemical Industry Co., Ltd., Tokyo, Japan; Tonaen Corporation, Tokyo, Japan; Ube Industries, Tokyo, Japan; and Nitto Denko K. K., Osaka, Japan.

Gel electrolyte 44 refers to a mixture of a gel-forming polymer and an electrolyte. During battery manufacture, the gel-forming polymer without the electrolyte may be applied to the microporous membrane 42, or the mixture of the gel-forming polymer and electrolyte may be applied to the membrane 42. Examples of the gel-forming polymer include, but are not limited to, polyvinylidene fluoride (PVDF); polyurethane; polyethyleneoxide; polyacrylonitrile; polymethylacrylate; polyacrylamide; polyvinylacetate; polyvinylpyrrolidone; polytetraethylene glycol diacrylate; copolymers of any of the foregoing, and combinations thereof. Electrolyte may be any electrolyte suitable for battery use.

The adherent coating 46 is applied to a surface of membrane 42, preferably both the exterior surface-and pore interior surfaces, and is interposed between membrane 42 and gel electrolyte 44 (or gel-forming polymer), and does not adversely affect ion conductivity (e.g., by pore blockage)., and does not materially increase membrane thickness or decrease membrane flexibility, and increases adhesion between or decreases delamination of the membrane 42 and gel electrolyte 44 (or gel-forming polymer). In this aspect of the invention, the coating 46 is used in addition to gel-forming polymer layer (or gel electrolyte) and is not a substitute therefor.

Figure 2:
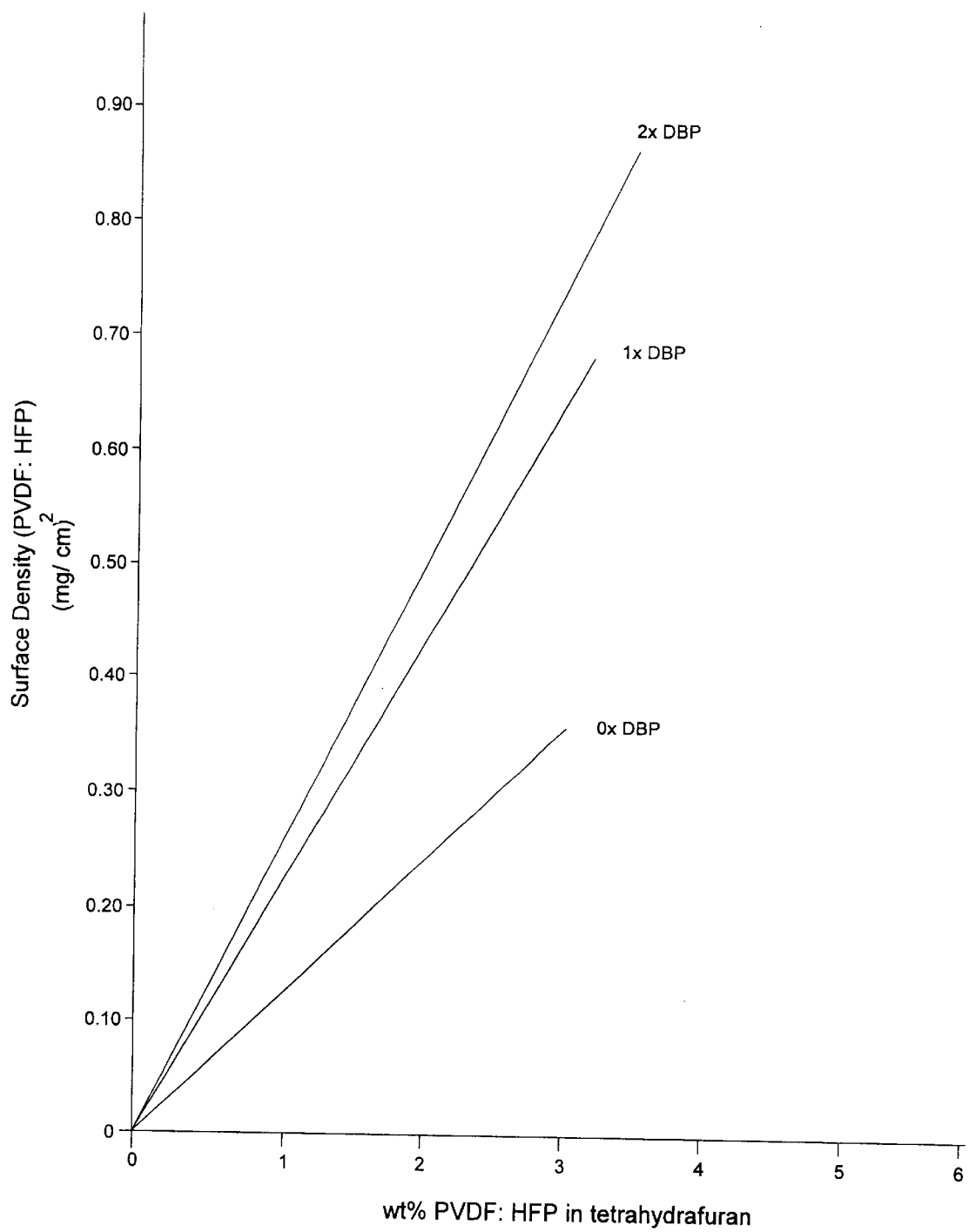
FIGS. 2–4 are graphical illustrations of the coatings' characteristics.
Figure 3:
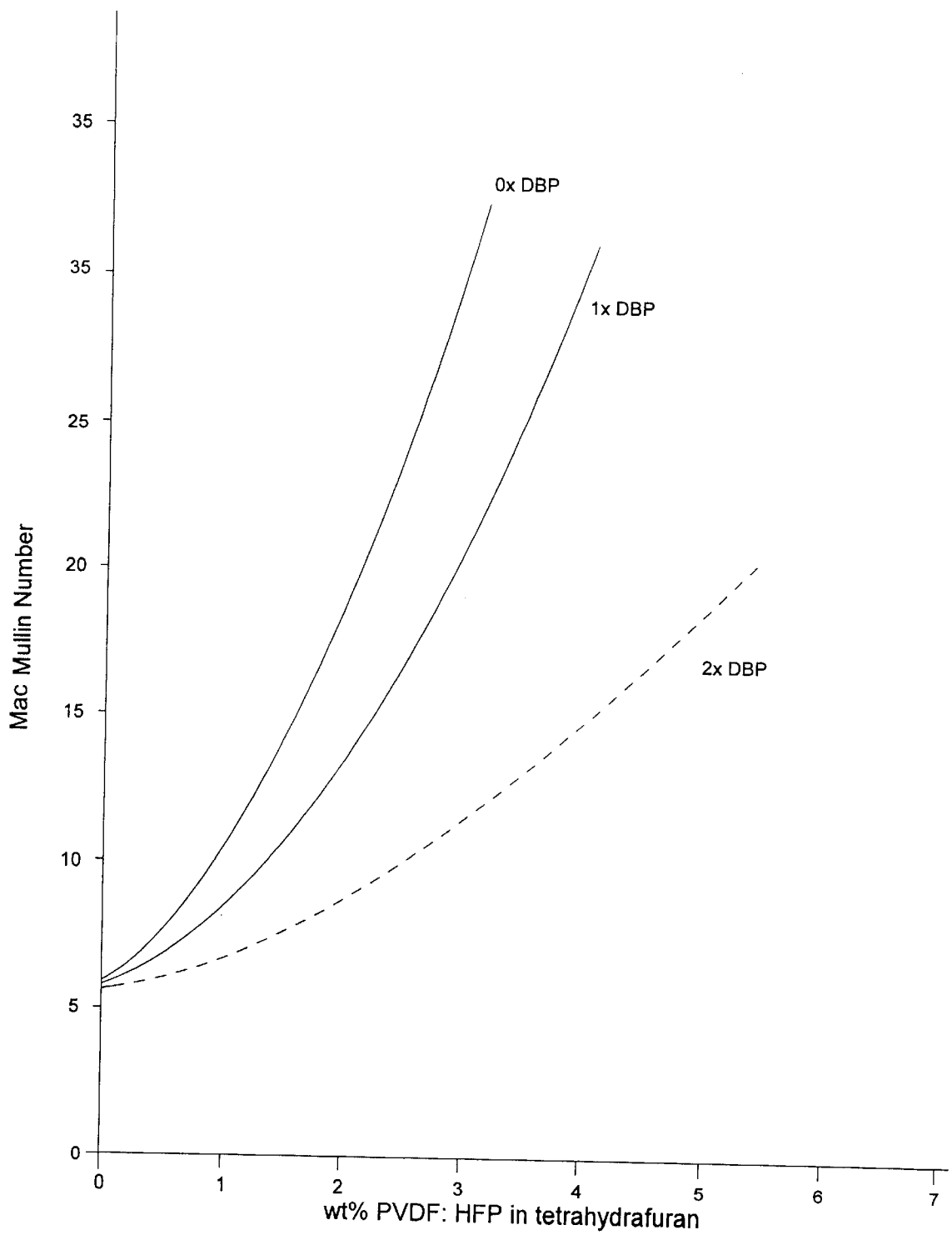
Figure 4:
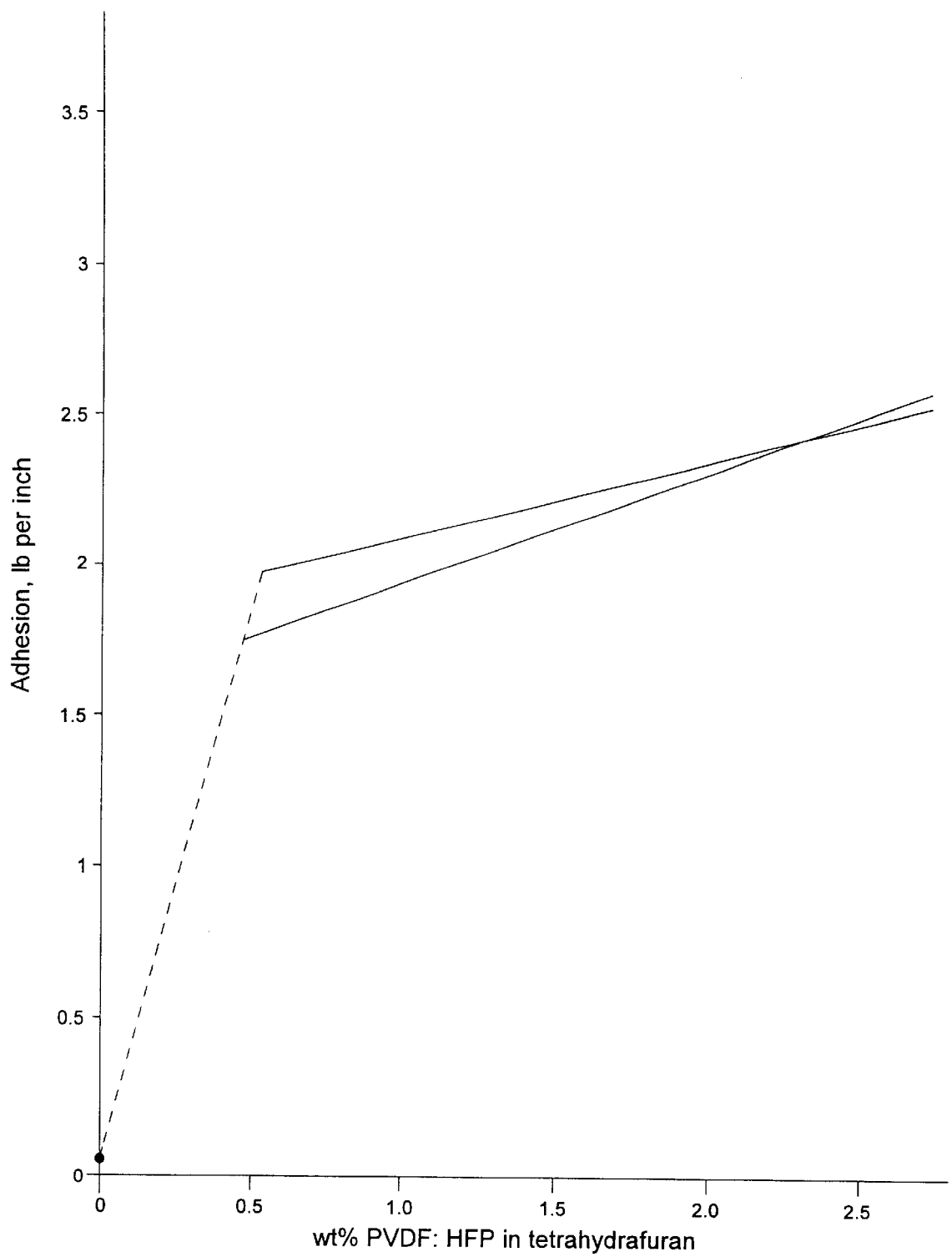

Coating 46 may be applied to membrane 42 in the form of a dilute solution of an active ingredient and a solvent. coating 46, to achieve suitable adhesion, should have a surface density in the range of less than 0.3 mg/cm² (preferably in the range of 0.05 to less than 0.3 mg/cm²; and most preferably 0.1 to 0.25 mg/cm²) The active ingredient is chosen, in one aspect, so that the surface energy of the coating ($\gamma_c$) is equal to or less than the surface energy of the membrane ($\gamma_m$). For example, typical membranes materials include polyethylene ($\gamma_{PE}$: about 35–36) and polypropylene ($\gamma_{PP}$, about 29–30). See, for example, A.F.M. Barton, *Handbook of Solubility Parameters*, 2d., C.R.C. Press, (1991), P. 586. Exemplary active ingredients include, but are not limited to, polyvinylidene fluoride (PVDF), polyacrylates, and polyacrrnitriles, copolymers thereof (e.g., PVDF copolyters, and more specifically PVDF:HFP (HFP:hexafluoropropylene or hexafluoropropene) copolymer) and mixtures thereof. The $\gamma_{PVDF}$ is about 32, and $\gamma_{PVDF:HFP}$, $\leq 25$. The solvent is chosen so that it can dissolve the active ingredient. Exemplary solvents include, but are not limited to, organic solvents, e.g., tetrahydrofuran, methyl ethyl ketone (MEK), and acetone. The dilute solution may contain less than 10% by weight of the active ingredient. FIGS. 2–4 illustrate surface density (mg/cm²), MacMullin Number (e.g., see U.S. Pat. No. 4,464,238), and adhesion (pounds/inch) as a function of % PVDF:HFP copolymer in solution (tetrahydrafuran). The notation 'xDBP' refers to equivalent amounts of plasticizer (DBP) to active ingredient.

The process to make a battery with a separator having the adherent coating may comprise the following steps: coating a microporous membrane with the mixture of active ingredient and solvent, and thereafter drying the separator; coating the separator with the gel-forming polymer; laminating the anode, coated separator, and cathode, to form a battery without electrolyte; placing that battery into a 'bag' (e.g., the leak-tight, flexible package that replaces the 'can'); adding electrolyte to the bag; and curing the battery to form the gel electrolyte, whereby the active battery is formed.

In an alternate embodiment, the absorbing or gel-forming layer discussed in U.S. Pat. Nos. 5,639,573; 5,681,357; and 5,688,293, incorporated herein by reference, is improved by the inclusion of a plasticizer. The plasticizer's primary function is to act as an extractable filler in the densely-coated (i.e., $\geq 0.3$ mg/cm²), absorbing or gel-forming layer. The plasticizer is necessary in the densely-coated layer because of the layer's tendency to blind pores or reduce the pore's diameter in the microporous membrane, and consequently reduce conductivity. Exemplary plasticizers include, but are not limited to, esters, e.g., phthalate-based ester, such as dibutyl phthalate.

The process to make a battery with a separator having a coating of a gel-forming polymer and a plasticizer may comprise the following steps: coating a microporous membrane with a solvated mixture of polymer and plasticizer; thereafter drying the separator; laminating (e.g., under heat and pressure) the anode, separator, and the cathode to form a battery without electrolyte; removing the plasticizer (e.g., by extraction with a suitable solvent, e.g., methanol); placing that battery into a 'bag'; and adding electrolyte to the bag, whereby the active battery is formed.

The present invention may be embodied in other specific forms without departing from the spirit or essential attributes thereof and, accordingly, reference should be made to the appended claims, rather than to the foregoing specification, as indicating the scope of the invention.

We claim:

1. A battery separator comprising:

a microporous polyolefin membrane; and a coating thereon, said coating having a surface density <0.3 mg/cm², and said coating further consisting essentially of a poly(vinylidene fluoride:hexafluoropropylene) copolymer.

2. The separator of claim 1 wherein said surface density ranges from 0.05 to <0.3 mg/cm².

3. The separator of claim 1 wherein said surface density ranges from 0.1 to 0.25 mg/cm².

4. A battery with the separator of claim 1.

5. The battery of claim 4 being a lithium ion battery.

6. The separator of claim 1 being a shutdown separator.

7. A battery separator comprising:

a microporous polyolefin membrane; and a gel-forming coating thereon, said coating consisting essentially of an absorbing or gel-forming polymer and a plasticizer being an ester.

8. The battery separator according to claim 7 wherein said ester is a phthalate.

9. The battery separator according to claim 8 wherein said phthalate is dibutyl phthalate.

10. A battery with the separator of claim 9.

11. The battery of claim 10 being a lithium ion battery.

12. The separator of claim 9 wherein said membrane being a shutdown separator.

13. A battery separator comprising:

a microporous polyolefin membrane; and a gel-forming coating thereon, said coating consisting essentially of an absorbing or gel forming polymer being a poly(vinylidene fluoride:hexafluoropropylene) copolymer and a plasticizer.

14. A battery with the separator of claim 13.

15. The battery of claim 14 being a lithium ion battery.

16. The battery of claim 15 wherein said separator being a shutdown separator.

17. A battery separator for a lithium battery comprising:

a microporous polyolefin membrane having a thickness ranging from 5 to 500 $\mu$, pore diameters ranging from 0.01 to 10 $\mu$, a porosity ranging from 35 to 85% and being made by either a dry stretch process or a solvent process; and a coating on said membrane, said coating consisting essentially of a gel forming polymer being a poly (vinylidene fluoride:hexafluoropropylene) copolymer and a plasticizer.

18. The separator of claim 17 being a shutdown separator.

19. A battery separator for a lithium battery comprising:

a microporous polyolefin membrane having a thickness ranging from 5 to 500 $\mu$, pore diameters ranging from 0.01 to 10 $\mu$, a porosity ranging from 35 to 85% and being made by either a dry stretch process or a solvent process; and a coating on said membrane, said coating consisting essentially of a gel forming polymer and a plasticizer being an ester.

20. The separator of claim 19 wherein said ester being a phthalate.

21. The separator of claim 20 wherein said phthalate being dibutylphthalate.

\* \* \* \* \*

UNITED STATES PATENT AND TRADEMARK OFFICE
CERTIFICATE OF CORRECTION

PATENT NO.   : 6,322,923 B1
DATED        : November 27, 2001
INVENTOR(S)  : Spotnitz et al.

It is certified that error appears in the above-identified patent and that said Letters Patent is hereby corrected as shown below:

Column 4,
Lines 29 and 31, change "claim 9" to -- claim 7 --.

Signed and Sealed this

Fourteenth Day of May, 2002

JAMES E. ROGAN
Director of the United States Patent and Trademark Office